United States Patent [19]

Waitts et al.

[11] Patent Number: 5,073,221
[45] Date of Patent: Dec. 17, 1991

[54] APPARATUS AND PROCESS OF MAKING MAGNETICALLY READABLE CARDS

[75] Inventors: Robert R. Waitts, West Caldwell; Jeffrey P. St. Thomas, Ramsey, both of N.J.

[73] Assignee: Crown Roll Leaf, Inc., Paterson, N.J.

[21] Appl. No.: 440,976

[22] Filed: Nov. 22, 1989

[51] Int. Cl.$^5$ .............................................. B32B 31/00
[52] U.S. Cl. ...................................... 156/253; 40/626; 40/630; 40/632; 156/155; 156/235; 156/238; 156/239; 156/282; 156/303; 360/131; 428/167; 428/189
[58] Field of Search ............... 156/282, 239, 303, 155, 156/235, 253, 238; 40/626, 632, 630; 428/167, 189; 360/131

[56] References Cited

U.S. PATENT DOCUMENTS 3,497,411  2/1970  Chebiniak ........................ 156/239
4,149,925  4/1984  Mintz .
4,231,828  11/1980 Mintz .
4,273,603  6/1981  Peronnet et al. .................. 156/238

Primary Examiner—John J. Gallagher
Attorney, Agent, or Firm—Lerner, David, Littenberg, Krumholz & Mentlik

[57] ABSTRACT

Magnetic stripes are applied to magnetically readable credit cards by incorporating the magnetic stripes in a cover sheet and laminating this cover sheet to a core stock sheet and then severing the laminated assembly into individual cards. The magnetic material bearing cover sheet is made by feeding the cover sheet without stripes continuously through a nip along with a plurality of tapes. Each tape is a laminate originally including a release layer, a magnetic layer, an adhesive layer, in that order, on a carrier layer. Heat and pressure applied to the nip releases the magnetic layer from the carrier layer and activates the adhesive layer to bond the magnetic layer of each tape to the original cover sheet, thus forming a stripe on the cover sheet. Distortion of the cover sheet by substantial shrinkage or wrinkling due to the heat effects resulting from the bonding operation are effectively eliminated by the use of a chill roller. In this regard, the nip is formed from a heated roller in juxtaposition to a reaction roller which contacts the cover sheet. The temperature of the reaction roller is controlled by surface contact with the chill roller to promote effective adhesive bonding while limiting shrinkage to the cover sheet in the order of less than 3%.

12 Claims, 2 Drawing Sheets

FIG. I

APPARATUS AND PROCESS OF MAKING MAGNETICALLY READABLE CARDS

BACKGROUND OF THE INVENTION

The present invention relates in general to an apparatus and process of making magnetically readable cards, and more particularly, to such an apparatus and process which prevents deformation or distortion of the thermoplastic carrier layer which supports the magnetic material and which forms a primary component of the magnetically readable cards.

Magnetically readable cards are frequently used as credit cards, bank cash machine cards, security passes and the like. These cards are typically constructed from a relatively heavy, rigid vinyl polymer core with thin vinyl polymer cover sheets or over-laminae bonded to opposite faces of the core. The core is often printed, whereas the cover sheets are transparent to allow readability of the printed material. The cover sheets are generally bonded to the core by application of both heat and pressure. To permit encoding of information on the card, the magnetically readable card includes a magnetic strip at or near the surface of the card. The magnetic strip incorporates a ferromagnetic powder such as an iron oxide in a binder including polymers such as vinyls. To provide satisfactory interaction with magnetic reading and writing equipment, the magnetic strip and the surrounding surfaces of the card should be precisely flat and free of defects. Moreover, the magnetic strip should be precisely flush with the adjacent surfaces of the card and should have a uniform thickness and straight edges. The magnetic strip also must be securely bonded to the remainder of the card.

Magnetic material ordinarily is formed into a thin layer on a carrier layer such as a polyester sheet by a solvent coating process. The carrier typically is a polyester-based polymer such as polyethylene tereptha-late ("PET") which can withstand the solvents used in the coating process. The resulting laminate is ordinarily provided with a meltable release layer disposed between the magnetic layer and the carrier layer and a heat active adhesive directly overlying the magnetic layer. The laminate can be slit into continuous strips or tapes. The magnetic layer can be transferred from its carrier layer directly to the card by placing the strip or tape on the card so that the adhesive layer faces the card, and then, applying heat and pressure through the carrier layer to melt the release layer and activate the adhesive, thus bonding the magnetic layer to the card. The carrier layer ordinarily is stripped off of the magnetic layer at this point.

It has been widely believed in the art that the heat and pressure applied in such a transfer operation necessarily would lead to severe distortion or deformation of a vinyl polymer sheet as a result of substantial thermally caused shrinkage unless the sheet is relatively thick. In processes such as those disclosed in U.S. Pat. Nos. 4,149,925 and 4,231,828, the magnetic material is transferred from its carrier directly to individual cards by feeding each card with a strip of the laminate superimposed thereon through a nip defined by a heated roller and a reaction roller. The carrier sheet of the laminate contacts the heated roller, whereas the adhesive layer of the laminate contacts the card. Heat transferred through the carrier layer activates the adhesive layer and melts the release layer, so that the magnetic material separates from its carrier layer and bonds to the card. The card as fed into the nip typically must include a relatively stiff or rigid core, ordinarily at least about 0.020 inches thick, in order to withstand the heat and pressure without unacceptable distortion. Handling individual cards is a relatively slow and hence expensive process.

Another process utilized heretofore produces a plurality of magnetically readable cards in a single production cycle. In this process, the core stock is provided as a large sheet having printed regions corresponding to a multiplicity of cards arranged in a matrix of several rows and columns across the face of the sheet, with waste or "gutter" spaces between those regions corresponding to individual cards. Cover sheets or over-laminae are superposed on the core stock and attached thereto only at an edge thereof. A plurality of strips or tapes of the aforementioned laminate are unwound from individual reels and laid onto one cover sheet so that each strip or tape lies in registration with the individual printed card regions. The magnetic material in each strip or tape is "tacked" or bonded to the cover sheet by localized application of heat and pressure at only those locations corresponding to the waste or gutter spaces between the printed card regions on the sheet of core stock. The carrier layer of each strip or tape is removed, leaving the magnetic material loosely attached to the cover sheet. The entire composite is then placed between a pair of heated platens and subjected to heat and pressure, so as to bond the cover sheets to the core stock and fuse the magnetic material with the adjacent cover sheet. Following the lamination step, individual cards are severed from the sheet of core stock by die cutting. Although the preliminary "tacking" step typically causes some distortion of the over-lamina and/or the underlying core stock, and hence some unevenness of the resulting magnetic layer, any such distortion and unevenness are confined to the waste or "gutter" areas of the sheets. The distorted regions thus do not appear in the finished cards after the die cutting operation.

This fabrication technique requires relatively complex equipment and procedures. The tacking operation must be discontinuous, to limit distortion of the over-lamina to the waste areas of the sheet. Moreover, the discontinuous process of unwinding only a limited length of each strip or tape and laying same onto a subassembly of cover layers and sheet of core stock of limited length is slow and troublesome. The original sheet of core stock must necessarily include waste areas to provide locations for tacking. Therefore, this process results in waste of materials. The composite, after the preliminary tacking step, is relatively fragile and poses considerable handling difficulties.

These disadvantages have been overcome, in part, by manufacturing magnetically readable cards in accordance with the apparatus and process disclosed in my co-pending U.S. Application Ser. No. 114,095, filed on Oct. 27, 1987.

In this regard, stripes of encodable magnetic material are applied in the fabrication of magnetically readable credit cards by incorporating the magnetic stripes in the cover sheet itself, as a secondary carrier, and laminating the resulting cover sheet to the sheet of core stock forming the credit card. The laminated credit card composite is then severed into individual cards. The magnetic strip bearing cover sheet is fabricated by feeding a continuous cover sheet without the magnetic stripes continuously through a nip formed between a heated roller juxtaposed with a reaction roller along with a plurality of continuous magnetic strips arranged in parallel rolls in registration with that portion of the credit card where they will ultimately be bonded. Each magnetic strip is provided as a laminate composite including a release layer, a magnetic layer, an adhesive layer, in that order, supported on a primary carrier layer. Heat and pressure applied within the nip releases the magnetic layer from the primary carrier and activates the adhesive layer to bond the magnetic layer of each strip to the original cover sheet, thus forming a plurality of parallel magnetic strips on the cover sheet itself.

The cover sheet may be formed from a variety of polymers, and typically vinyl polymers such as polyvinyl chloride. As the cover sheet is frequently very thin, on the order of less then about 0.010 inches, as well as being thermally sensitive, the cover sheet is subject to deformation, i.e., wrinkling, by the substantial shrinkage thereof as a result of being subjected to heat during the bonding operation. It has been found that vinyl polymer sheets utilized for the cover sheet can have a shrinkage amount of 30 to 40% when subjected to uncontrolled heat during the processing operation. In order to overcome this shrinkage problem, the previously known process required close control of a variety of parameters and processing conditions, for example, the thickness of the cover sheet, the polymer material being used, the roller temperatures, the contact times, tension applied to the cover sheet, the roller surface speeds and the like. These parameters and processing conditions were required to be maintained within close limits to suppress wrinkling or distortion of the cover sheet. The difficulty in maintaining and controlling these parameters and processing conditions have made the aforementioned known process difficult to maintain and requiring process operators having engineering abilities typically not employed in such manufacturing operations. The slightest deviation from any one of the above parameters or processing conditions, could result in the wrinkling or distortion of the cover sheet with the resulting material being unusable.

Accordingly, there is the need for improvements in the manufacture of magnetically readable cards.

SUMMARY OF THE INVENTION

In accordance with one object of the present invention, there is provided an apparatus and process of making magnetically readable cards which prevents deformation by substantial thermal shrinkage of the thermoplastic material, i.e., cover sheet, which forms a component thereon.

Another object of the present invention is to provide an apparatus and process of making magnetically readable cards which requires minimum operator skill for controlling the parameters and processing conditions.

Another object of the present invention is to provide an apparatus and process for making magnetically readable cards which is continuous and, accordingly, more economical then previously known semi-batch processing.

Another object of the present invention is to provide an apparatus and process of making magnetically readable cards which can provide increased processing speeds and, therefore, enhance productivity.

In accordance with one aspect of the present invention, at least one laminate strip or tape including a layer of magnetic material on a carrier layer and a heat-activated adhesive layer on the magnetic layer is passed through the nip formed between a heated roller arranged juxtaposed with a second roller, together with a thin thermoplastic cover sheet. The cover sheet is preferably a vinyl polymer sheet less than about 0.010 inches thick, preferably less than about 0.005 inches thick, and may be 0.002 inches thick or less. The laminate strips or tapes, together with cover sheet, are fed through the nip so that the adhesive layer of the laminate strip or tape faces towards the cover sheet, and the carrier layer faces away from the cover sheet. Preferably, both the cover sheet and the laminate strips or tapes are substantially continuous webs, typically in roll form, and both the cover sheet and the laminate strips or tapes are advanced through the nip in substantially continuous motion.

Heat is applied to the cover sheet and to the laminate strips or tapes for bonding by maintaining the heated roller in contact with the carrier sheet at an elevated temperature. The second roller is maintained in intermittently surface contact with a chill roller connected to a source of cooling fluid. The chill roller maintains the surface temperature of the second roller at a temperature within the range of about 80°-120° F. This temperature range is effective to achieve reliable bonding of the magnetic laminate strip or tape to the cover sheet without causing the deformation thereof as a result of substantial heat shrinkage. The ability to maintain the second roller at a controlled temperature, in addition to enhancing the bonding qualities, allows for increase production speeds and greater reliability.

The cover sheet with magnetic laminate stripes or tapes thereon can be made economically. Continuous processing of the cover sheet and laminate strips or tapes through the nip can be performed at high speed, and with only infrequent interruptions. These aspects of the present invention incorporate the realization that, contrary to the expectations of the art, a layer of magnetic material can be bonded to a thin poly cover stock sheet without significant distortion of the sheet using heat and pressure. Because the apparatus and process according to the present invention eliminates the troublesome and wasteful discontinuous processing steps previously employed and, the previously required sensitive parameters and processing conditions needed to apply magnetic layers on cards, the present apparatus and process provides significant cost savings.

In accordance with one embodiment of the present invention, there is provided a method of making composite material including a sheet of plastic material having at least one layer of magnetic material thereon, the method comprising the steps of advancing a sheet of plastic material towards a nip formed by a heated first roller juxtaposed a second roller, advancing a layer of magnetic material towards the nip in registration with the sheet of plastic material, bonding the layer of magnetic material to the sheet of plastic material by application of heat and pressure thereto within the nip to form the composite material, heating the first roller to a first temperature sufficient to bond the layer of magnetic material to the sheet of plastic material, and cooling the second roller to a second temperature sufficient to prevent deformation of the plastic material by the substantial shrinkage thereof, the cooling comprising contacting the outer surface of the second roller with a third roller maintained at a third temperature sufficient for cooling the second roller to the second temperature thereby preventing deformation of the plastic material.

In accordance with another embodiment of the present invention, there is provided, an apparatus for making a composite material including a sheet of plastic material having at least one layer of magnetic material thereon, the apparatus comprising means for advancing a sheet of plastic material, means for advancing a large of magnetic material in registration with the sheet of plastic material, a heated first roller juxtaposed a second roller to provide a nip therebetween for receiving the sheet of plastic material and the layer of magnetic material in registration thereto, heating means for heating the first roller to a first temperature sufficient to bond the layer of magnetic material to said sheet of plastic material upon application of pressure thereto within the nip, a third roller arranged contacting the outer surface of the second roller, and cooling means for maintaining the third roller for maintaining the second roller at a second temperature sufficient to prevent deformation of the plastic material by the substantial shrinkage thereof.

In accordance with another embodiment of the present invention, there is provided a method of making a plurality of magnetically readable cards the method comprising the steps of making a composite material having a plurality of parallel strips of magnetic material by the method as claimed in the above description, placing the composite material overlying a sheet of stock material bonding the composite material to the sheet of stock material and, subdividing the bonded sheet to provide individual magnetically readable cards.

BRIEF DESCRIPTION OF THE DRAWINGS

The above description, as well as further objects, features and advantages of the present invention will be more fully understood with reference to the following detailed description of an apparatus and process of making magnetically readable cards, when taken in conjunction with the accompanying drawings, wherein.

DETAILED DESCRIPTION

Figure 1:
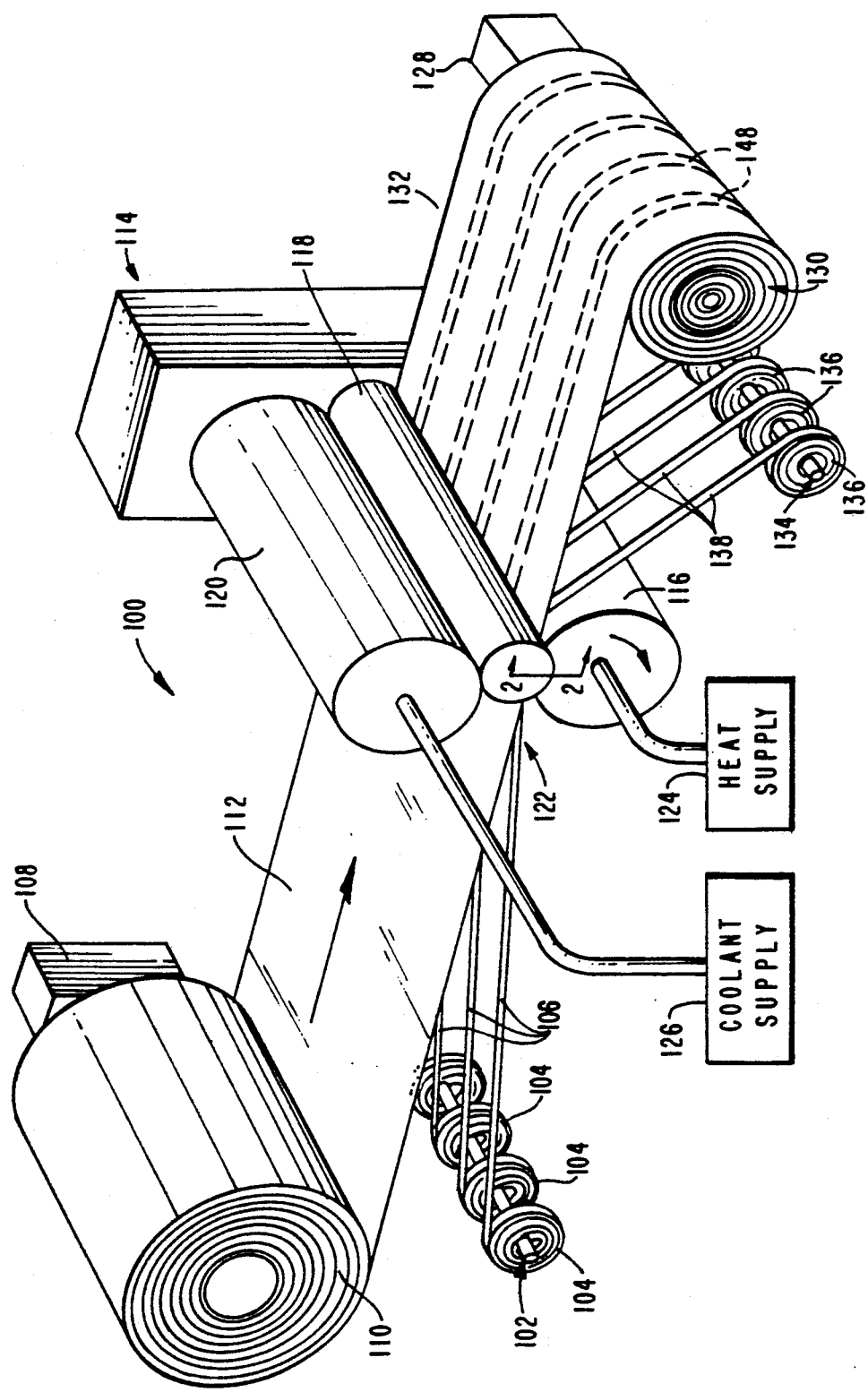
FIG. 1 is a schematic view showing an apparatus and process of making magnetically readable cards in accordance with one embodiment of the present invention.

Referring now to the drawings, wherein like reference numerals represent like elements, there is shown in FIG. 1 an apparatus 100 for continuously bonding strips of magnetic material to a -polymer cover sheet. The apparatus 100 includes a payout stand 102 for receiving a plurality of supply rolls 104 of laminated magnetic material 106. An additional payout stand 108 is provided for receiving a continuous supply roll 110 of vinyl polymer cover sheet material 112. A roller stand 114 is positioned downstream for supporting a heated roller 116, a second roller 118 and a chill roller 120. The heated roller 116 is arranged juxtaposed with the second roller 118 to provide a nip 122 therebetween. The chill roller 120 is arranged in continuous surface engagement with the second roller 118 which is of smaller diameter.

The heated roller 116 is heated by means of heat supply 124, for example, pressure steam, heated oil and the like. In addition, it is contemplated that the heated roller 116 may be heated electrically through such conventional means. The chill roller 120 is cooled by means of a coolant supply 126. The coolant supply 126 may be in the nature of recirculated chilled water, brine and the like. The exterior surface temperature of the chill roller 120 may effectively be controlled to any desired surface temperature by means of the coolant supply 126. Similarly, the surface temperature of the heated roller 116 may be effectively controlled to any desired surface temperature by means of the heat supply 124.

Upstream from the roller stand 114 there is provided a take up stand 128 for supporting a roll 130 of the bonded magnetic material bearing cover sheet 132. In addition, a take up stand 134 is provided for supporting individual rolls 136 of carrier material 138 which have been removed from the laminated magnetic material 106 as to be described hereinafter.

The process for making a magnetic material bearing cover sheet and a plurality of magnetically readable cards therefrom will now be described in accordance with one embodiment of the present invention. A wide, continuous carrier sheet of a polyester polymer, such as polyethylene terepthalate about 0.001 inches thick, is processed in a conventional coating apparatus (not shown) so as to apply, in succession, a release layer, a layer of magnetic material and a layer of adhesive. The release layer may include natural waxes and silicones, and the composition of the release layer is selected so that its melting range is below about 200° F., and preferably, between about 160° F. and about 200° F. The quantity of release coating deposited on the carrier sheet is the minimum required to provide a continuous coating on the carrier sheet. A layer of magnetic material is then applied atop the waxy release layer by a conventional, reverse-roll solvent coating process.

The magnetic layer may include fine iron oxide particles in a binder incorporating vinyl and urethane polymers. Ordinarily, the magnetic material and binder are dispersed in a solvent such as methyl ethyl ketone or toluol, and this dispersion is then applied over the release layer. After the dispersion is applied, the solvent is evaporated from the newly applied layer, leaving the iron oxide and binder as a solid, dry layer. The dry layer, so applied preferably is less then about 0.001 inches thick, and more preferably, about 0.0005 inches thick. An adhesive is applied over the dry magnetic material layer. Typically the adhesive includes ingredients such as a low-melting vinyl polymer. The adhesive may be applied as a solvent dispersion and dried by evaporation of the solvent. The adhesive is selected so that it is not tacky at room temperature but will become tacky upon heating to a predetermined activation temperature. The activation temperature of the adhesive is desirably below about 150° F., and preferably between about 100° F. and about 120° F.

The laminate resulting from the above described coating operation is in the form of a substantially continuous web. As used in this disclosure with reference to a sheet, web, strip or tape, the term "continuous" means having a length generally of at least about 50 feet. Typically, the continuous sheets, webs, strips and tapes are hundreds of feet long, and are in roll form. The continuous laminate web is slit into a plurality of individual continuous tapes of laminated magnetic material 106. Each such tape is about as wide as the desired magnetic strip in the cards to be manufactured. Typically, such magnetic strips, and hence each tape made in the slitting operation, is about 0.5 inch wide or less. Inasmuch as the edges of the individual tapes made in the slitting operation will constitute the edges of the magnetic strips in the finished cards, the slitting operation should be controlled so that the edges of the tapes are smooth and straight. The laminate web is easily slit, and acceptable edges can be provided by conventional slitting techniques.

Referring to FIG. 1, the individual tapes of laminated magnetic material 106 resulting from the slitting operation are arranged on the payout stand 102 so that the supply rolls 104 holding the individual tapes are spaced laterally from one another. The supply roll 110 holding a continuous web of thin vinyl polymer chloride cover sheet 112 is mounted on the payout stand 108. The vinyl polymer cover sheet 112 preferably is less than about 0.010 inches thick, more preferably less than about 0.005 inches thick, and may be about 0.002 inches thick or even less. The vinyl polymer cover sheet 112 may consist essentially of polyvinyl chloride, with conventional plasticizers. The cover sheet 112 and tapes of laminated magnetic material 106 are arranged so that the tapes extend substantially parallel to the lengthwise direction of the cover sheet. The cover sheet 112 and the individual tapes of laminated magnetic material 106 are led through the nip 122 defined by the pair of juxtaposed heated roller 116 and second roller 118 mounted on the roller stand 114 for rotation about parallel axes. The heated roller 116 is of larger diameter than the second roller 118.

Figure 2:
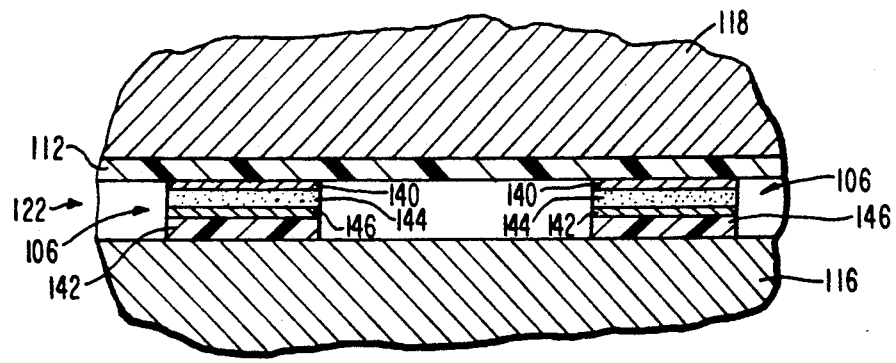
FIG. 2 is a fragmentary, sectional view on an enlarged scale taken along line 2—2 in FIG. 1.

As best seen in FIG. 2, the tapes of laminated magnetic material 106, as previously described, and the cover sheet 112 are arranged so that the adhesive layer 140 of the laminate faces towards cover sheet 112, whereas the carrier layer 142 faces away from the laminate as the tapes and cover sheet pass through the nip 122. Thus, the carrier layer 142 of the laminate contacts the heated roller 116 at the nip 122, whereas the cover sheet 112 is in contact with the second roller 118 at the nip. The thickness of the individual layers in each tape, including adhesive layer 140, carrier layer 142, magnetic layer 144 and release layer 146 are greatly exaggerated for clarity of illustration in FIG. 2.

Heated roller 116 is maintained by heated fluid from the heat supply 124 at an elevated temperature preferably less than about 400° F., preferably, between about 350° and 400° F., and more preferably at about 375° F. as measured at the surface of the roller. The second roller 118 is not heated except by incidental heat conduction through the tapes of laminated magnetic material 106 and cover sheet 112. The rollers 116,118 are rotated so that the confronting portions of the rollers move in a downstream direction, away from payout stands 102,108 and hence generally to the right as seen in FIG. 1. Both rollers 116,118 run at substantially the same surface speed. This surface speed preferably is about 75 feet per minute, and more preferably between about 50 and 80 feet per minute. Therefore, cover sheet 112 and each of the tapes of laminated magnetic material 106 will be pulled through the nip 122 by the rolling surfaces at a high speed corresponding to the surface speed of the rollers 116,118. Roller stand 114 is actuated to force the rollers 116,118 towards one another and thus to apply a predetermined pressure at nip 122. This pressure is preferably at least about 100 pounds per linear inch based upon the total width of all of the tapes of laminated magnetic material 106 passing through the nip 122. Most preferably, the nip pressure is about 150 to about 250 pounds per linear inch on the same basis.

As the tapes of laminated magnetic material 106 and the cover sheet 112 pass downstream through nip 122, heat is transferred into the tapes and the cover sheet from the rollers 116,118. The amount of heat transfer will depend upon the time of contact between the tapes of laminated magnetic material 106 and heated roller 116, and the time of contact between cover sheet 112 and reaction roller 118, as well as the roller temperatures including the chill roller 120. The time of contact between the cover sheet 112 and second roller 118 will depend upon the surface speed of the roller and also upon the length of wrap of the cover sheet upon the second roller. The time of contact of the cover sheet 112 with second roller 118 or time from the moment each portion of the cover sheet first contacts the roller to the moment that such portion of the cover sheet passes through the "throat" or narrowest point of nip 122 is less than about 0.5 seconds, and desirably less than about 0.3 seconds. Heated roller 116 is of larger diameter than second roller 118, and each tape of laminated magnetic material 106 is in contact with a substantial portion of the circumference of heated roller upstream of the nip 122. Therefore, the carrier layer 142 of each tape of laminated magnetic material 106 is in contact with heated roller 116 for a substantial time, desirably between about one and about four seconds, and most desirably between about two and about three seconds, before reaching the narrowest point of nip 122.

As the tapes of laminated magnetic material 106 and cover sheet 112 pass downstream to nip 122, the adhesive layer 140 reaches its activation temperature range. Likewise, the release layer 146 of each tape of laminated magnetic material 106 reaches its melting range, so that the carrier layer 142 of the tape is freed from the magnetic layer 144. As the tapes of laminated magnetic material 106 and cover sheet 112 pass downstream through the throat of nip 122, the magnetic layer 144 bonds to cover sheet 112, so that the magnetic layer 144 of each tape is transferred from the carrier layer 142, thereby forming the magnetic material bearing cover sheet 132. In other words, under the influence of heat and pressure at the nip 122, the adhesive layer 140, magnetic layer 144 and portions of the vinyl cover sheet 112 merge to form magnetic strips 148 integral with the cover sheet. The magnetic material bearing cover sheet 132 is separated from the rollers 116,118 immediately upon passage through the nip 122.

As previously described, the surface of the heated roller 116 is maintained at a temperature in the range of from about 350°-450° F. This temperature, based upon the operating parameters and conditions of the apparatus 100, is sufficient to cause effective bonding of the laminated magnetic material 106 to the cover sheet 112. During the bonding operation within the nip 122, heat is transferred from the heated roller 116 to the surface of the reaction roller 118. As the surface of the second roller 116 is in contact with the cover sheet 112, the resulting temperature of the reaction roller is a primary factor in causing distortion or deformation of the cover sheet by substantial shrinkage thereof. It has been found that the reaction roller 118 should be maintained at a temperature above ambient to achieve the requisite bonding, while at a temperature which will substantially eliminate any deformation or distortion, i.e., wrinkling, of the cover sheet 112.

The preferred operating temperature for the second roller 118 is dependent upon a number of physical parameters and processing conditions. By way of example only, these may include the material composition of the cover sheet 112 and laminated magnetic material 106, the nature of the adhesive layer 140, the size of the heated roller 116 and second roller 118, as well as their surface speed, the pressure formed within the nip 122, the contact times of the material within the nip and the like. The particular temperature or temperature range for operation of the second roller 118 may be determined by trial and error. In accordance with the embodiment thus far described, the second roller 118 is maintained at a surface temperature within the range of 80°-120° F. and, preferably at about 100° F. This is achieved by maintaining the chill roller at a temperature of from about 40°-60° F. by means of coolant fluid from the coolant supply 126. Preferably, in accordance with the embodiment thus far described, the chill roller 120 is maintained at a surface temperature of about 50° F. Under these processing conditions it is possible to stabilize the process to provide adequate heat transfer for activation of the adhesive layer 140 and release layer 146 of each tape of laminated magnetic material 106, but which nonetheless does not result in overheating and hence wrinkling of the cover sheet 112 which supports the magnetic strips 148.

Figure 3:
FIG. 3 is a fragmentary, sectional view on an enlarged scale showing a product made in accordance with the process of FIGS. 1 and 2.

As the magnetic material bearing cover sheet 132 emerges from the nip 122, it is wound into a roll 130 maintained on the take-up stand 128 downstream from the nip. Also, as the magnetic material bearing cover sheet 132 emerges from the nip 122, the layers of carrier material 138 are pulled away from the cover sheet 112, leaving the magnetic strips 148 behind. The freed layers of carrier material 138 may be taken up on rolls 136 or otherwise disposed of. The magnetic material bearing cover sheet 132 includes the original cover sheet 112, the adhesive layer 140 and magnetic layers 144 originally present in the laminate tapes. The construction of the resulting magnetic material bearing sheet 132 is shown in FIG. 3, with the thicknesses of the various layers greatly exaggerated. Each of the magnetic strips 148 extends lengthwise along the cover sheet 112, and each of these magnetic strips 148 is bonded over substantially the entire extent of the stripe to the original cover sheet.

Figure 4:
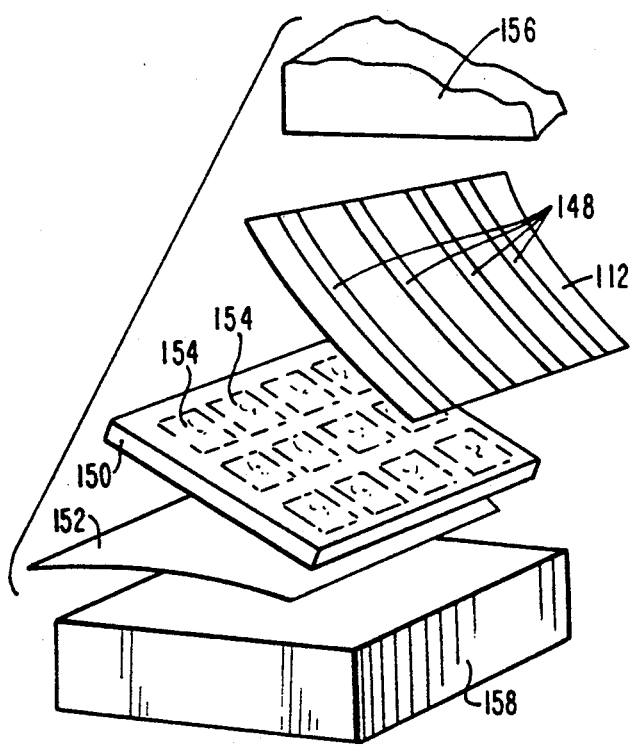
FIG. 4 is a schematic view showing a further step in the process of FIGS. 1-3.

The magnetic material bearing cover sheet 132 may be used to manufacture magnetically readable cards by the process schematically illustrated in FIG. 4. The magnetic material bearing cover sheet 132 is laid onto one face of a core stock sheet 150, and a further cover sheet 152 is juxtaposed with the opposite face of the core stock sheet to form a "sandwich". The magnetic material bearing cover sheet 132 ordinarily is superposed upon core stock sheet 150 so that the magnetic stripes 148 face away from the core stock sheet. The core stock sheet 150 is normally arranged so that predetermined regions 154 of the sheet correspond to individual cards to be manufactured, and so that these predetermined regions are arranged in substantially parallel rows. Typically, although not necessarily, each region 154 would incorporate indicia to appear on a single finished card.

The magnetic material bearing cover sheet 132 can be positioned in registration with the core stock sheet 150 by conventional methods and apparatus used to maintain registration between multiple sheets in ordinary laminating processes. Thus, in one arrangement, all of the sheets to be laminated may be prepunched with holes at predetermined locations, and these holes in the various sheets may be maintained in registry with one another by placing all of the sheets onto appropriate pins or rods. The core stock sheet 150 and the opposite cover sheet 152 may both be formed from vinyl polymers such as polyvinyl chloride. Credit cards are customarily made with core stock sheets 150 about 0.020-0.024 inches thick. However, no minimum or maximum core stock thickness is required in the present process. The ability to apply a magnetic stripe 148 on a thin vinyl core stock 150 constitutes a significant advantage, inasmuch as it permits production of a thin card. Also, the opposite cover sheet 152 is ordinarily less than about 0.005 inches thick, but here again, there is no particular minimum or maximum. Indeed, the opposite side cover sheet 152 may be entirely omitted. Normally, however, the opposite side cover sheet 152 is used to protect printing or other indicia on the reverse side of the core stock sheet 150.

Figure 5:
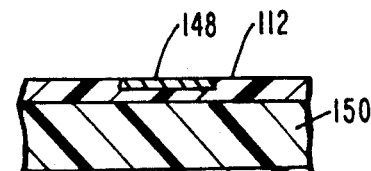
FIG. 5 is a fragmentary, sectional view taken along line 5—5 in FIG. 6.

The entire subassembly or sandwich of sheets 132, 150 and 152 is placed between a pair of opposed, flat, polished heated platens 156, 158, and the platens are forced towards one another so as to apply heat and pressure to the entire sandwich. Under these conditions, the vinyl polymer of the original cover sheet 112 forming the magnetic material bearing cover sheet 132 fuses with the core stock sheet 150, whereas the opposite side cover sheet 152 also fuses with the core stock sheet. The magnetic material in each magnetic stripe 148, and the surrounding areas of the cover sheet 112 conform exactly to the surface of platen 156. Therefore, the surface of the sandwich, after engagement with the platens 156,158 has a flat, flush configuration with the surface of the magnetic strip 148 being precisely flat and coplanar with the surface of polyvinyl chloride layer 112, as shown in FIG. 5. Desirably, the laminating step is performed under conditions similar to those used in laminating conventional, non-striped cover sheets to core stock layers, viz., about 1000 pounds per square inch pressure based on the area of the sandwich and platen temperatures of about 320° F. to about 350° F., with the platens 156,158 being maintained under pressure for about twenty minutes.

Figure 6:
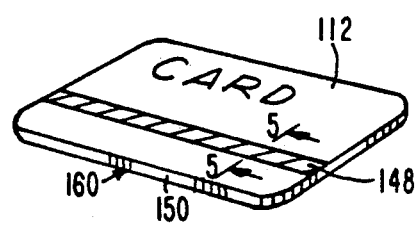
FIG. 6 is a schematic view showing a completed magnetically readable card made by the process of FIGS. 1-4.

After the sandwich has been pressed between the platens, 156,158 it is removed and the portions of the sandwich corresponding to the individual regions 154 are cut apart, as by die cutting or the like to yield the individual cards 160 shown in FIG. 6. The individual cards 160 can be subjected to conventional post-treatment processes such as embossing, application of color to embossed features and application of other auxiliary features.

As will be appreciated, the foregoing description of the preferred embodiments is merely exemplary of the present invention as defined in the claims. Numerous variations and combinations of the features described above can be utilized without departing from the present invention. For example, the magnetic material bearing sheet 132 can be laminated continuously to a continuous core stock sheet 150. Although the present invention, of course, offers the greatest benefit with magnetic material bearing cover sheets 132 having a multiplicity of magnetic strips 148, the invention can be applied to production of a cover sheet having only a single magnetic strip 148 and such a cover sheet could be used with a core stock sheet 150 incorporating only a single row of cards, or with only a single card in an individual laminating process. In a further variation, the binders of the magnetic material may serve as the adhesive. Thus, if the binders in the magnetic layer 144 of each tape include low-melting vinyls, the binder layer itself will fuse to the vinyl cover sheet 112 in the described process. The binder layer thus provides an adhesive at the surface of the binder layer remote from the carrier layer 142. This arrangement is less preferred because binders capable of activation at low temperatures typically provide relatively soft magnetic strips 148 which are susceptible to damage in use of the finished cards 160. As these and other variations and combinations of the features described above can be employed, the foregoing description of the preferred embodiments should be taken by way of illustration rather than by way of limitation of the present invention.

What is claimed is:

1. A method of making composite material including a sheet of plastic material having at lest one layer of magnetic material thereon, said method comprising the steps of advancing a sheet of plastic material towards a nip formed by a heated first roller juxtaposed with a second roller, advancing a layer of magnetic material towards said nip in registration with said sheet of plastic material, bonding said layer of magnetic material to said sheet of plastic material by application of heat and pressure thereto within said nip to form said composite material, said bonding comprising contacting said layer of magnetic material with said heated first roller and said sheet of plastic material with said second roller with said nip, heating said first roller to a first temperature sufficient to bond said layer of magnetic material to said sheet of plastic material, and cooling said second roller to a second temperature sufficient to prevent deformation of said plastic material by substantial shrinkage thereof, said cooling comprising contacting the outer surface of said second roller with a third roller maintained at a third temperature sufficient for cooling said second roller to said second temperature thereby preventing deformation of said plastic material.

2. The method of claim 1, wherein said first roller is heated to a temperature in the range of about 350°–400° F.

3. The method of claim 1, wherein said second roller is maintained at said second temperature in the range of about 80°–120° F.

4. The method of claim 1, wherein said third roller is maintained at a temperature in the range of about 40°–60° F.

5. The method of claim 1, wherein said plastic material comprises a vinyl polymer.

6. The method of claim 1, wherein said magnetic material comprises a composite material including a layer of carrier material, a layer of said magnetic material on one surface of said carrier material and a layer of adhesive material on the exposed surface of said magnetic material.

7. The method of claim 6, further including providing a layer of release material between said carrier material and said magnetic material.

8. The method of claim 6, wherein said bonding includes heating said layer of adhesive material to its melt temperature by said heated first roller and applying pressure within said nip.

9. The method of claim 1, wherein said layer of magnetic material comprises a plurality of parallel strips of said magnetic material.

10. A method of making a plurality of magnetically readable cards, said method comprising the steps of making a composite material having a plurality of parallel strips of magnetic material by the method as claimed in claim 9, placing said composite material overlying a sheet of stock material, bonding said composite material to said sheet of stock material and, subdividing the bonded sheet to provide an individual magnetically readable cards.

11. The method of claim 10, further including aligning said plurality of parallel strips of magnetic material in registration with predetermined portions of said sheet of stock material.

12. The method of claim 11, wherein said subdividing said bond sheet comprises subdividing between said parallel strips of magnetic material.

* * * * *

UNITED STATES PATENT AND TRADEMARK OFFICE
CERTIFICATE OF CORRECTION

PATENT NO. : 5,073,221

DATED : December 17, 1991

INVENTOR(S) : Robert P. Waitts, et al.

It is certified that error appears in the above-identified patent and that said Letters Patent is hereby corrected as shown below:

Column 1, line 63, "reaction" should read --second--.
Column 3, line 1, "reaction" should read --second--.
Column 5, line 6, "large" should read --layer--.
Column 5, line 11, "thereto" should read --thereon--.
Column 5, line 58, delete "-" before polymer.
Column 7, line 5, "inch" should read --inches--.
Column 8, line 13, "reaction" should read --second--.
Column 8, line 61, "reaction" should read --second--.
Column 8, line 62, "116" should read --118--.
Column 8, line 63, "reaction" should read --second--.
Column 8, line 66, "reaction" should read --second--.
Column 11, line 21, "lest" should read --least--.
Column 11, line 33, "with" should read --within--.

Signed and Sealed this

Fourth Day of May, 1993

Attest:

MICHAEL K. KIRK

Attesting Officer

Acting Commissioner of Patents and Trademarks